United States Patent
Betz

(10) Patent No.: US 7,735,371 B2
(45) Date of Patent: Jun. 15, 2010

(54) DYNAMIC PRESSURE PROBE WITH ADAPTERS FITTED ON THE PROBE HEAD

(75) Inventor: Oliver Betz, Gröbenzell (DE)

(73) Assignee: Systec Controls Mess-und Regelungstechnik GmbH, Puchheim (DE)

( * ) Notice: Subject to any disclaimer, the term of this patent is extended or adjusted under 35 U.S.C. 154(b) by 0 days.

(21) Appl. No.: 11/814,861

(22) PCT Filed: Jan. 19, 2006

(86) PCT No.: PCT/DE2006/000073

§ 371 (c)(1),
(2), (4) Date: Jul. 26, 2007

(87) PCT Pub. No.: WO2006/079314

PCT Pub. Date: Aug. 3, 2006

(65) Prior Publication Data

US 2008/0202256 A1    Aug. 28, 2008

(30) Foreign Application Priority Data

Jan. 26, 2005  (DE) .................. 20 2005 001 314 U

(51) Int. Cl.
*G01L 7/00* (2006.01)
*G01F 1/00* (2006.01)

(52) U.S. Cl. .......................... 73/700; 73/861

(58) Field of Classification Search ........... 73/700–756, 73/861.01–861.65
See application file for complete search history.

(56) References Cited

U.S. PATENT DOCUMENTS

| | | | | |
|---|---|---|---|---|
| 2,902,861 A | * | 9/1959 | Frost et al. ................... | 73/715 |
| 3,068,693 A | * | 12/1962 | Ferran et al. ............. | 73/204.19 |
| 3,289,480 A | * | 12/1966 | Sams ........................... | 73/744 |
| 3,438,397 A | * | 4/1969 | Gilpin .................... | 137/599.09 |
| 3,905,230 A | * | 9/1975 | Calvet et al. ............. | 73/204.17 |
| 4,062,238 A | * | 12/1977 | Herzl ...................... | 73/861.24 |
| 4,116,059 A | * | 9/1978 | Herzl ...................... | 73/861.24 |
| 4,154,100 A | | 5/1979 | Harbaugh et al. | |
| 4,453,401 A | * | 6/1984 | Sidey ............................ | 73/73 |
| 4,154,100 A | | 11/1987 | Harbaugh et al. | |
| 4,703,661 A | | 11/1987 | Evers | |
| 6,557,423 B1 | * | 5/2003 | Vozhdaev et al. ........ | 73/861.65 |
| 7,013,738 B2 | * | 3/2006 | Krog et al. .................... | 73/861 |

FOREIGN PATENT DOCUMENTS

| | | |
|---|---|---|
| DE | 28 42 676 | 7/1979 |
| EP | 0 198 197 A2 | 10/1986 |
| WO | 00/08452 | 2/2000 |

\* cited by examiner

*Primary Examiner*—Lisa M Caputo
*Assistant Examiner*—Jermaine Jenkins
(74) *Attorney, Agent, or Firm*—Laurence A. Greenberg; Werner H. Stemer; Ralph E. Locher

(57) ABSTRACT

The invention relates to a dynamic pressure probe for universal use, which enables different types of mounting of the connection lines without complex adapters and/or round arches. The dynamic pressure probe comprises a probe head inside of which channels run, which lead to the part of the probe that, during a measurement, is located in the medium to be measured, and which lead to adapters mounted on the probe head, said probe head having a rectangular cross-section. The axes of the channels are located on the diagonals that run between two corners of the probe head, and the channels can be reached from two outer surfaces of the probe head via transversal boreholes.

4 Claims, 1 Drawing Sheet

DYNAMIC PRESSURE PROBE WITH ADAPTERS FITTED ON THE PROBE HEAD

BACKGROUND OF THE INVENTION

1. Field of the Invention

The invention relates to a dynamic pressure probe in which channels run in a pressure tube. These channels end respectively in one or more openings. In order to measure the differential pressure of a flowing medium, the pressure tube is positioned in the flowing medium such that the openings of one channel are directed upstream, and the openings of the other channel are directed downstream.

At the other end of the pressure tube, the channels continue in a headpiece of square or rectangular cross section.

Dynamic pressure probes are used in order to detect the flow rate of gas, steam or liquid.

2. Prior Art

Such a dynamic pressure probe is known from EP 0198197 B1.

The connecting line of the channel axes is perpendicular to a pair of the outer surfaces, and runs parallel to the other pair of the outer surfaces of the headpiece. Located in the headpiece are bores that respectively meet a channel from an opposite side. Elements adjoining screwed glands are fastened on the headpiece. These elements are, for example, condensate vessels or tube bends.

Arranged downstream of these elements is in each case a channel of sensors that measure the pressure.

It is disadvantageous in the known dynamic pressure probe that there is a need to fit additional adapters and/or tube bends between the headpiece of the probe and the sensors, depending on mounting position and/or the course of the connecting lines.

When measuring liquids, it is necessary for the static pressure bearing on the sensors to be equal. This static pressure arises from the standing liquid column in the adapters and/or round bends and/or other connecting lines.

When measuring steam, it is necessary for the condensate to be able to flow off again from the dynamic pressure tube.

The measurements of the different media can be carried out on lines running horizontally or vertically, from which there result a multiplicity of mounting possibilities.

For each way of mounting both channels, it is necessary in the prior art to lay the adapters and/or round bends and/or other connecting lines in a fashion accurately adapted to one another, such that the liquid column is of the same height for both sensors.

SUMMARY OF THE INVENTION

Technical Object

It is the object of the invention to provide a dynamic pressure probe that can be used universally and enables the different ways of mounting to be covered without expensive adapters and/or round bends.

Technical Solution

The invention achieves this object by means of a dynamic pressure probe whose channels run in the head of the dynamic pressure probe in a particular and inventive way.

It is possible through a specific configuration of the head to implement any desired way of mounting with the aid of a standardized connecting element that is then mounted, in a fashion meeting the individual way of mounting as required by the situation, in a specific position on the head.

ADVANTAGEOUS EFFECTS

Owing to the fact that only a standardized connecting element is required, there is advantageously a reduction in the multiplicity of parts.

In particular, the outlay required by the prior art on calibrating the level for the liquid column is eliminated according to the invention.

DESCRIPTION OF THE INVENTION

Figure 1:
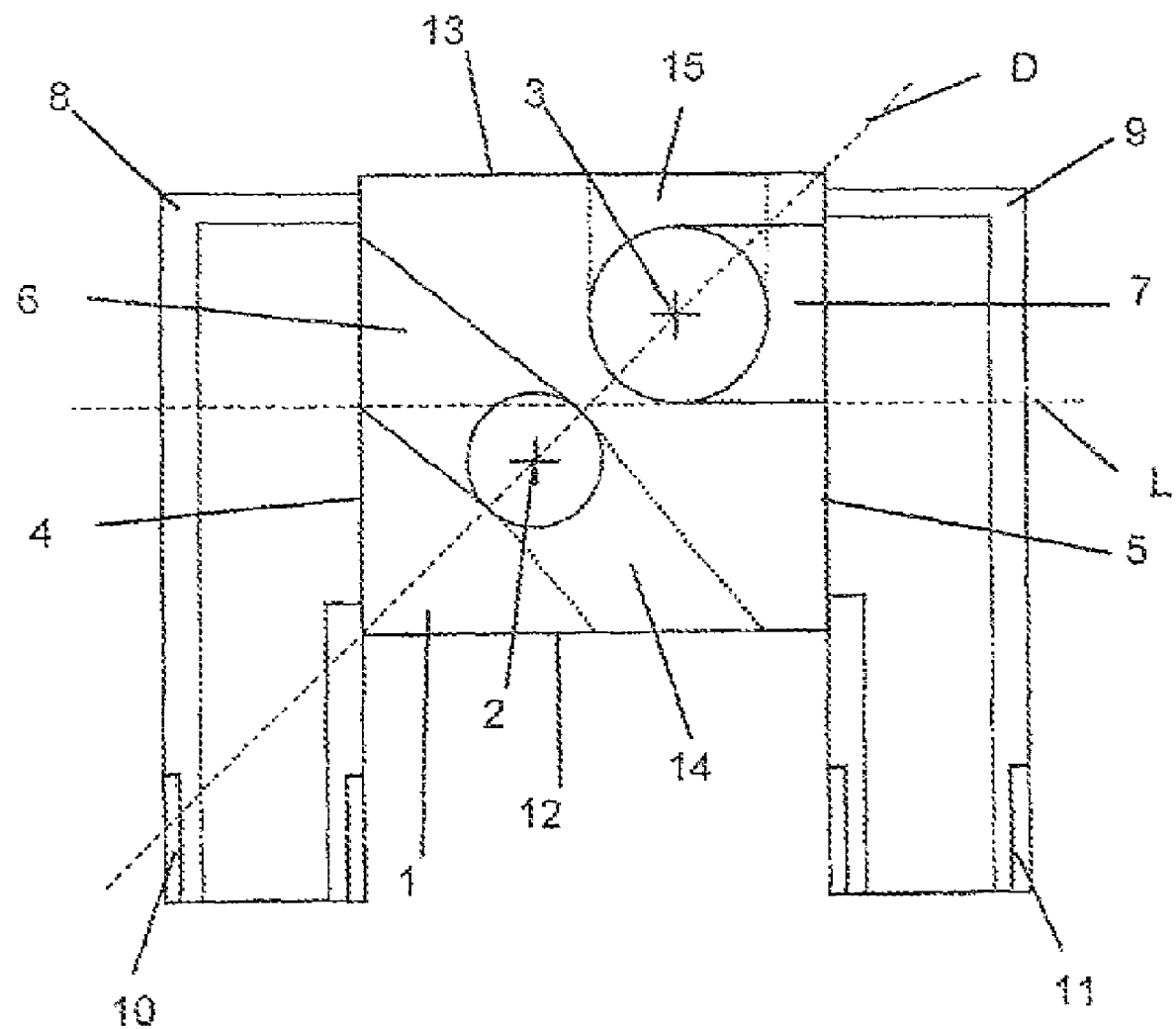
FIG. 1 shows a plan view of a cross section through the head of the inventive dynamic pressure probe.

FIG. 1 shows a probe head 1 of rectangular cross section. Channels 2, 3 run in the head 1. The axes of the channels 2, 3 lie on a line that connects corners of the head 1 situated obliquely opposite one another.

These channels 2, 3 lead to the part (not shown here) of the probe that is located inside the flowing medium during a measurement.

Bores 6, 7 that meet the channels 2, 3 run from two oppositely situated outer surfaces 4, 5 of the head 1.

Fastened on the outer surfaces 4, 5 are adapters 8, 9, the latter being welded on, for example. Before being welded, the adapters 8, 9 can be rotatably positioned around the line L at any desired angle—preferably in 90 degrees steps.

This results in a high level of flexibility in adapting to the spatial conditions in which the probe is intended to be used later.

For their part, the adapters have a thread 10, 11. The adapters 8, 9 and threads 8, 9 are dimensioned such that the standard dimensions (54 mm distance) for the direct connection of differential pressure measuring transducers are satisfied.

This additionally simplifies the mounting of the measuring system.

The flexibility of the inventive probe with regard to the most varied of connecting conditions is, moreover, increased in as much as it is also possible to fasten the adapters to the outer surfaces 12, 13 instead of to the outer surfaces 4, 5.

For this instance, the bores 14, 15 illustrated by dots are carried through as far as the channels 2, 3. The bores 6, 7 are then not present.

The bores 6, 7 and 14, 15 are selected such that the bore entrance lies at the same level. In the example shown, this level lies on the line L.

It is thereby automatically achieved in accordance with the invention that liquid columns of equal height come to bear on both sides of the differential pressure sensor in the case of measurements of flowing liquids.

During the measurement of steam, the steam condenses in the cavity of the adapters 8, 9, and over time the adapters 8, 9 also fill up with liquid during a steam measurement, doing so up to the line L, and the liquid column of equal height comes to bear on both sides of the differential pressure sensor.

INDUSTRIAL APPLICABILITY

The invention can be applied to measure the speed of flowing media in wide fields of use.

The invention claimed is:

1. A dynamic pressure probe, comprising:
a probe head, a part configured to be located in a medium to be measured, and adapters fitted on the probe head;
the probe head formed with channels leading to the part configured to be located in the medium; and
the probe head having a rectangular cross section;
wherein the probe head has opposite two corners, the channels have axes, and the axes of the channels lie on a diagonal running between the two corners of the probe head.

2. The dynamic pressure probe as claimed in claim 1, wherein the probe head has a square cross section.

3. The dynamic pressure probe as claimed in claim 1, wherein the probe head is formed with at least two outer surfaces and with transverse bores, and the channels reach the outer surfaces of the probe head via the transverse bores.

4. The dynamic pressure probe as claimed in claim 3, wherein the bores include an oppositely situated pair of bores formed with bore exits lying at the same level.

* * * * *